United States Patent [19]

Casas

[11] 4,240,702
[45] Dec. 23, 1980

[54] FIELD CORRECTOR FOR TWO MIRROR OBJECTIVE SYSTEMS

[75] Inventor: Raul E. Casas, Danbury, Conn.

[73] Assignee: The Perkin-Elmer Corporation, Norwalk, Conn.

[21] Appl. No.: 940,743

[22] Filed: Sep. 8, 1978

[51] Int. Cl.³ .............................................. G02B 17/00
[52] U.S. Cl. .................................................. 350/200
[58] Field of Search .............................. 350/199, 200

[56] References Cited

U.S. PATENT DOCUMENTS

| | | | |
|---|---|---|---|
| 2,229,302 | 1/1941 | Martin et al. | 350/200 |
| 3,022,708 | 2/1962 | Baker | 350/200 |
| 3,489,487 | 1/1970 | Casas | 350/199 |
| 3,515,461 | 6/1970 | Casas et al. | 350/199 |
| 3,547,525 | 12/1970 | Rayces et al. | 350/200 |

OTHER PUBLICATIONS

Wilson, R. N., "Corrector Systems for Cassagram Telescopes," *Applied Optics*, vol. 7, No. 2, Feb. 1968, pp. 353-363.

*Primary Examiner*—John K. Corbin
*Assistant Examiner*—Scott J. Sugarman
*Attorney, Agent, or Firm*—Salvatore A. Giarratana; Francis L. Masselle; Edwin T. Grimes

[57] ABSTRACT

An optical system providing a new field lens corrector group for a two mirror telescope. The field group corrector has a negative net power and allows the resulting system to have a long back focus and low obscuration while covering a wide field of view. The field corrector group provides the overall system with good Petzval curvature aberration correction characteristics because the aberration of the corrector group is of opposite sign to the Petzval curvature aberration of the two mirror system. The negative field corrector group is designed to increase the f number speed of the two mirror system.

11 Claims, 5 Drawing Figures

FIELD CORRECTOR FOR TWO MIRROR OBJECTIVE SYSTEMS

BACKGROUND OF THE INVENTION

This invention relates to a catadioptric system. More specifically this invention relates to a two mirror telescopic objective having a field lens corrector group.

In conventional mirror telescope systems, it is known to provide a field group corrector lens having a positive net power. The purpose of the corrector group is to speed up the f number of the two mirror system, which has a relatively slow value, to the higher f number value required by the overall system. However, because the Petzval curvature aberration of such a positive field group has the same sign as the aberration of the two mirror system, the net aberration of the overall system is quite undesireable.

In order to provide good aberration correction, the prior art systems were required to compound the positive field group into several different elements, each of which had strongly curved negative surfaces. This was necessary to correct for aberrations while maintaining a positive net power to speed up the f number of the system.

Thus, the conventional two mirror system disadvantageously increases the Petzval curvature type aberration for the overall two mirror system as it increases the f number of the transmitted rays. This requires the use of many lens elements in the field group having strongly curved negative surfaces, thus increasing the cost and complexity of the system.

It is incidentally noted that my own prior U.S. Pat. No. 3,489,487 shows an example of a single mirror system useful in photography and electronic processing having a spherical aberration corrector component and a corrector component for compensation for under correction of coma and astigmatism from the single mirror.

It is an object of the present invention to provide a two mirror telescopic system having good Petzval curvature aberration correction characteristics while simultaneously increasing the f number of the system.

It is a further object of the present invention to provide such a two mirror system having a long back focus, low obscuration characteristics, covering a wide field of view, and comprising a minimum amount of components.

SUMMARY OF THE INVENTION

In accordance with the present invention, a two mirror telescope system includes a first aspheric mirror having a concave reflecting surface and a second associated aspheric mirror having a convex reflecting surface. The first mirror is positioned behind the second mirror so that rays striking the reflecting surface of the first mirror are reflected towards the second mirror, strike the second mirror, and are reflected back towards the first mirror. An aperture defined on the first mirror allows these rays to pass through the first mirror and into a field group correction lens positioned behind the first mirror.

The field group corrector includes a positive (converging) lens and a negative (diverging) lens and is designed so that the overall net power of the field group is negative. Thus, the negative net power system advantageously has an aberration of opposite sign to that of the Petzval curvature aberration of the two mirror system, thereby providing good aberration correction to the entire system. This results from the fact that the aberrations of opposite sign cancel each other out. By positioning the nodal points of the field group to lie outside the lenses of the group and in proper position relative to the focus of the two mirror system, the negative field group can speed up the f number of the system to the required value, thus achieving the advantages associated with a positive power field correction group.

Thus, the negative powered field group corrector advantageously acts like a positive field group corrector by speeding up the f number of the system and also has the good aberration correction associated with a negative field group corrector.

Use of the field corrector group also provides the system with a long back focus.

DETAILED DESCRIPTION OF THE DRAWINGS

Figure 1:
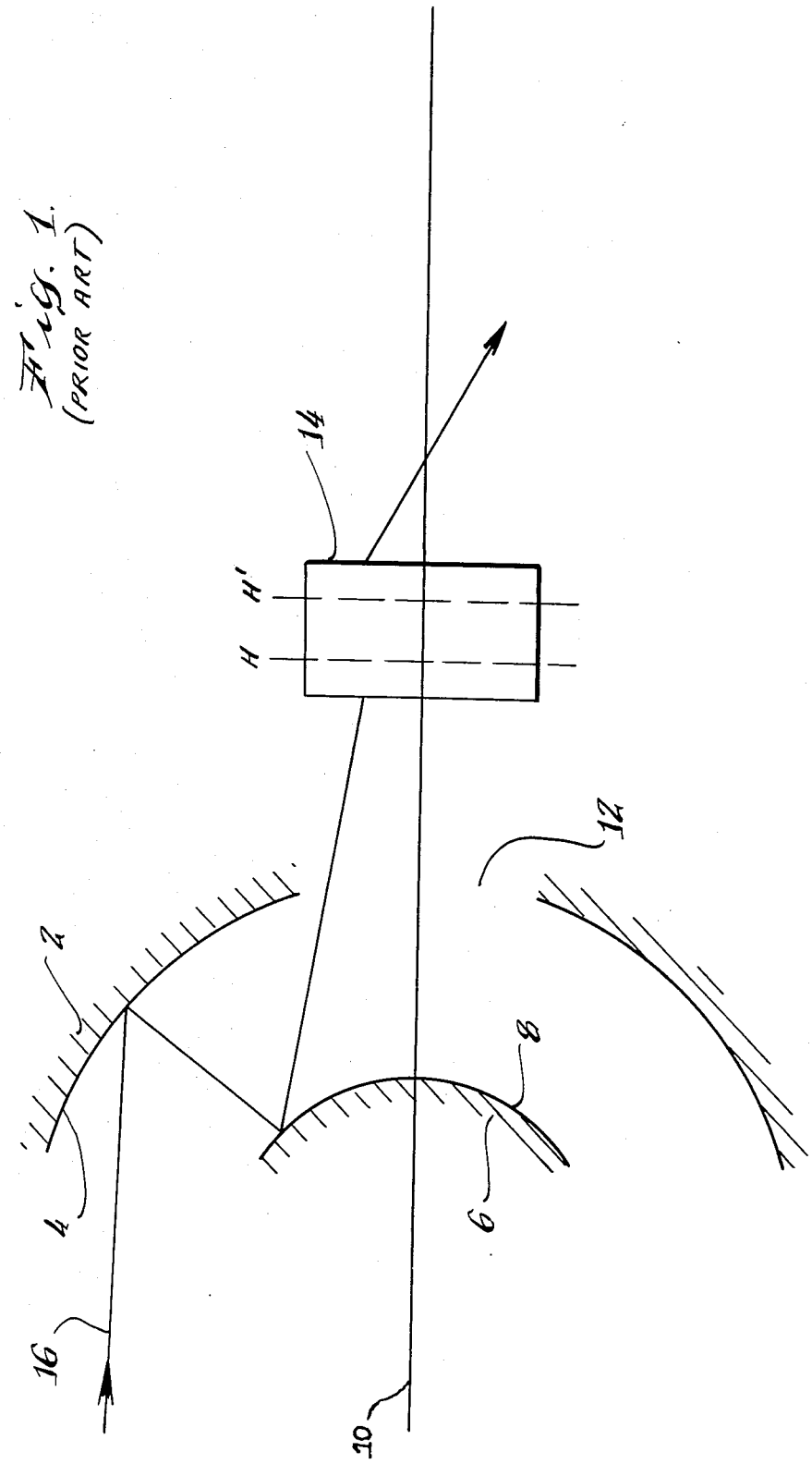
FIG. 1 shows an example of a conventional two mirror system having a positive net power field correction group.

Referring specifically to FIG. 1 of the drawings, a conventional two mirror telescopic system is shown. The system includes a primary aspheric mirror 2 having a reflecting surface 4 and a secondary aspheric mirror 6 having a reflecting surface 8. The optical axis of this two mirror system is shown by the numeral 10.

The primary mirror defines an aperture 12. This aperture is positioned so that the optical axis 10 passes through the center thereof.

A field group corrector 14, having a positive net power, is centered on the optical axis 10 in alignment with the aperture 12. The field group generally comprises a plurality of positive (converging) lenses. The object principal plane of the corrector group is indicated by H and the image principal plane is indicated by H', symbols which are well known to those skilled in the art.

In operation, an incident ray 16 strikes the reflecting surface 4 of primary mirror 2 and is reflected towards the reflecting surface 8 of secondary mirror 6. The ray is then reflected through the aperture 12 and enters the field group corrector 14. Because the field group corrector is positive, the ray is converged towards the optical axis, speeding up the f number of the two mirror system. (Note that the angle of the ray leaving the field group relative to the optical axis is greater than the angle of the ray entering the field group relative to the optical axis).

One major disadvantage of this conventional system is that the Petzval curvature aberration associated with the two mirror system is of the same sign as the aberration of the field group. The aberration of the overall system is increased because the total aberration is equivalent to the sum of the aberration of the mirrors and the aberration of the field group corrector. In order to provide good aberration correction in such a system, it is necessary to compound the field group into many separate elements, each of which having strongly curved negative surfaces, thereby increasing the complexity and cost of the system.

Figure 2:
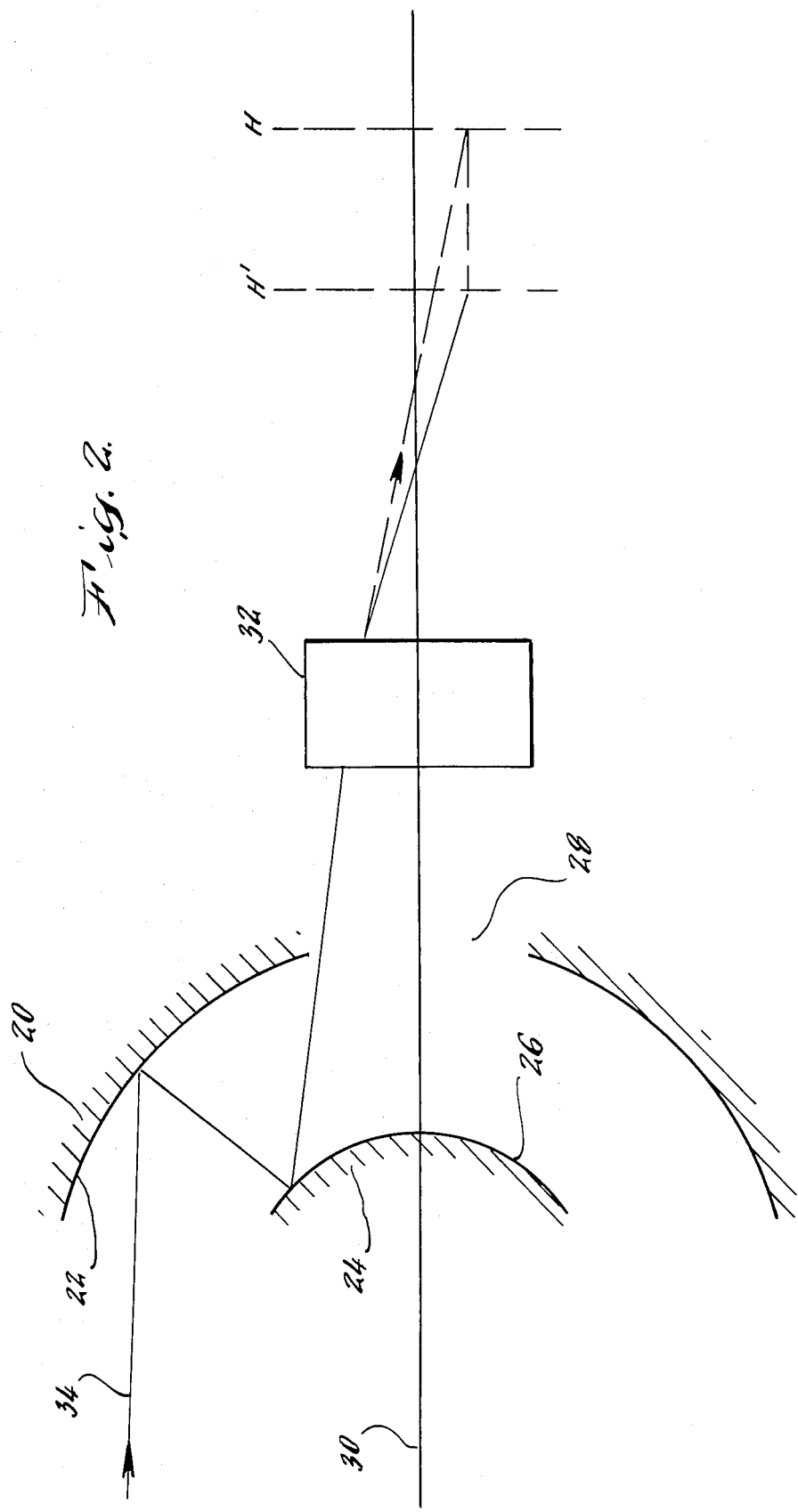
FIG. 2 shows an embodiment of the present invention having a negative net power field correction group.

Referring to FIG. 2, a two mirror system embodying the present invention is shown. A primary mirror 20 has a reflecting surface 22, and a secondary mirror 24 has a reflecting surface 26. Primary mirror 20 defines an aperture 28. An optical axis 30 passes through the center of the aperture.

A field group corrector 32 is positioned behind the aperture in alignment therewith to receive rays which pass through the aperture. For example, ray 34 strikes reflecting surface 22 of primary mirror 20, is reflected towards reflecting surface 26 of secondary mirror 24, and is further reflected through the aperture 28 and strikes the negative field group corrector 32.

Figure 3:
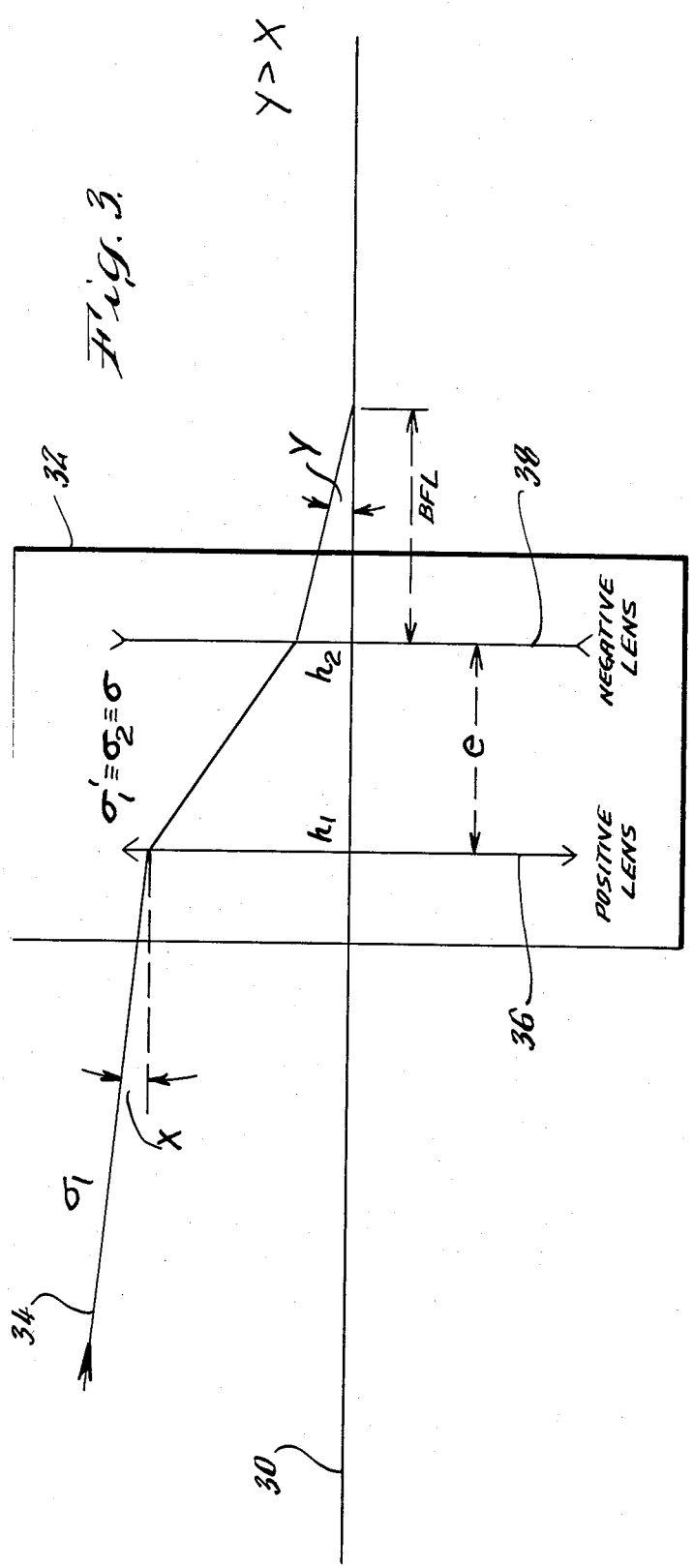
FIG. 3 shows a schematic diagram of an embodiment of the present invention.

The field group corrector 32 has a net negative power. As illustrated in FIG. 3, this negative field group can include a positive (converging) lens and a negative (diverging) lens. The corrector group is designed so that its negative net power is achieved by proper distribution of the relative powers of each of the lenses.

Figure 5:
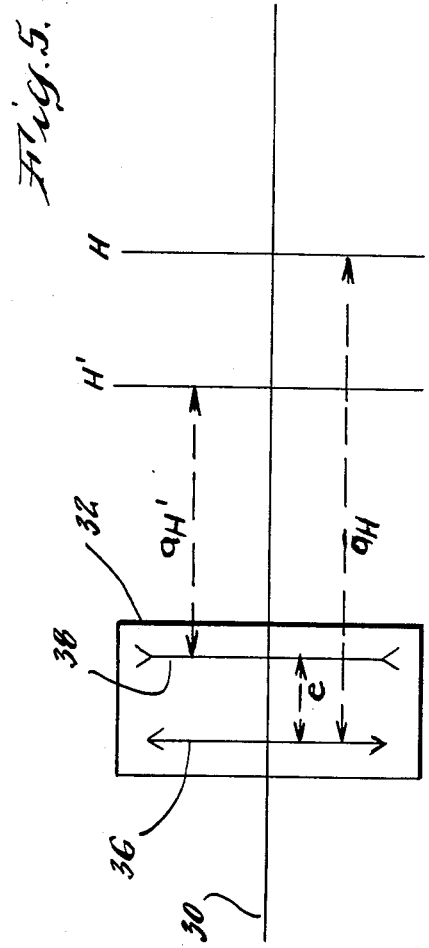
FIG. 5 shows a diagram of a negative field group corrector and the location of its principal object and image points.

The principal points of the field corrector group are outside of and behind the corrector group, as shown in FIGS. 2 and 5. These points are also inverted. That is, the principal object point H is further behind the field group than is the principal image point H'. (Compare this to the conventional system of FIG. 1 in which the principal points are in the corrector group itself and are positioned in opposite order). By positioning the principal points of the field corrector group outside of the lens, the relatively slow f number speed of the two mirror system is speeded up.

Thus, proper design of the negative field corrector groups results in speeding up the f number of the system to the required final value. This is unlike the normal negative corrector group which would slow down the f number of the system.

The operation of the field group is more specifically described as follows with reference to FIG. 3. The incident ray 34 (from the two mirror system) enters the field group 32, passes through the positive (converging) lens 36 and is bent towards the optical axis 30. The ray then passes through the negative (diverging) lens 38 and is shifted slightly away from the optical axis. However, this ray is still more inclined or angled with respect to the optical axis than it was prior to its entry into the corrector group. Thus, the net result is that the ray has been bent more towards the optical axis, increasing the f number of the two mirror system.

As a very general example, it is possible that the ray incident to the corrector group is at an angle of 5° with respect to the optical axis. The positive lens of the corrector group converges this ray so that it now forms an angle of 20° with the optical axis. The ray is then diverged by the negative lens so that it leaves the corrector group at an angle of 15° relative to the optical axis. Thus, the net result is that the incident ray (5° angle) is bent more strongly towards the optical axis (15°) when it emerges from the corrector group. Thus, the f number of the system is speeded up.

As indicated above, this result is possible because the principal points H and H' of the corrector group are located away from (and behind) the lenses of the corrector group. Thus, the negative corrector group advantageously acts like a positive corrector group by increasing the f number speed of the two mirror system.

However, the advantage of having a corrector group of net negative power is that the total aberration of this group is opposite in sign so that of the Petzval curvature aberration of the two mirror system. The total aberration of the overall system is equivalent to the sum of the Petzval curvature of the mirrors plus the aberration of the field group. Thus, the two opposite sign aberrations cancel each other, resulting in correction for the Petzval curvature, thereby reducing the total aberration of the system. This advantageously avoids the previously mentioned complex and more expensive procedure used to correct aberration in the conventional positive field group correctors.

It has also been found that use of a net negative power increases the back focal length of the two mirror system. This occurs because the f number speed of the two mirrors can be less than the final f number speed of the overall system since the corrector group speeds up the f number of the two mirrors. Thus, parallel rays incident to the primary mirror can emerge from the two mirror system at a lower f number speed (and thus at a lesser angle relative to the optical axis) and intersect the optical axis at a further distance behind the two mirror system, thereby increasing the back focal length. In contrast, conventional field groups of positive power shorten the back focus.

EXAMPLE

An example of the calculation of the parameters of the disclosed system is illustrated as follows.

A set of formulas which compute the thin lens fundamental parameters of the new two mirror system is described below. The parametric relationships for these formulas is shown by FIG. 3.

By definition, $$\beta = \sigma 1/\sigma 2 = \text{magnification} \quad (1)$$

$$P = -\left(\frac{\phi_1}{n_1} + \frac{\phi_2}{n_2}\right) \text{Petzval} \quad (2)$$

For simplicity we assume $n_1 = n_2$. Also, $$h_2 = BFL/2f_{No} \quad (3)$$

$$\phi_1 = \frac{2f_{No}\sigma - \beta}{2h_1 f_{No}} \quad (4)$$

$$\phi_2 = \frac{1 - 2f_{No}}{BFL} \quad (5)$$

Substituting in Equation (2), $$P = -\left(\frac{2f_{No}\sigma - \beta}{2h_1 f_{No} n} + \frac{1 - 2f_{No}\sigma}{BFL\, n}\right) \quad (6)$$

From Equation (6)

$$\sigma = \frac{2Pf_{No}h_1 nBFL + BFL\beta - 2f_{No}h_1}{2f_{No}BFL - 4f_{No}^2 h_1} \quad (7)$$

Also, $$e = \frac{2f_{No}h_1 - BFL}{2f_{No}\sigma} \quad (8)$$

Figure 4:
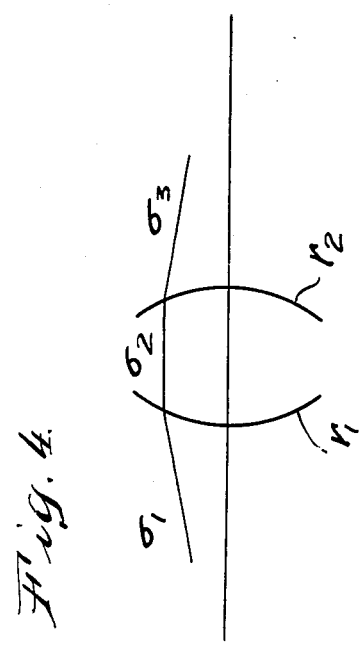
FIG. 4 shows a diagram useful in calculating the parameters of a two mirror system incorporating the present invention.

In lenses of zero axial thickness the two primary chromatic aberrations and the Petzval sums are invariant with respect to the lens shape, as long as their power is constant. By selecting the power and separation to fulfill the Petzval requirements, the remaining primary aberrations can be corrected by appropriate "bendings". We can select different three-order aberration formulas. Some of the more practical are those published in Optical Acta 1961, "Thin-Lens Aberration Theory" by C. G. Wynne and by G. G. Sliusarev in his book "Optical Systems Design Methods", 1943. Referring to FIG. 4 and using the latter text, the astigmatism is $$S_{III} = \Sigma h P (\Delta\beta/\Delta\alpha)^2$$

where $$P = \left(\frac{\sigma' - \sigma}{\frac{1}{n'} - \frac{1}{n}}\right)^2 \Delta \frac{\sigma}{n}$$

$\beta$ = Paraxial angle for the principal ray
$\sigma$ = Paraxial angle for the marginal ray
$\beta_2$ = Can be used for determining the shape of the lens $$r_1 = \frac{S(n-1)}{\sigma_2 n - 1}, \quad r_2 = \frac{S(n-1)}{\sigma_2 n - \sigma_3} \quad (9)$$

Starting with a Ritchey-Chretien design as shown below,
$R_1 = -43.6194$
$e = 16.0489$
$R_2 = -14.5113$
$\epsilon_1 = 1.02$
$\epsilon_2 = 1.59$
$\sigma = 1.5°$
$f_{No} = 10$ We can complete the required compensation from the contributions of Petzval aberration and astigmatism. Selecting the location of the corrector so that $h_1 = 0.5$ and the $BFL = 2.44$ the fundamental parameters of the field corrector can be determined from equations (4), (5), (7) and (8) and are listed below.
$f_1 = 14.79$
$e = 4.337 \quad a_{H'} = 3.74$
$f_2 = -4.89 \quad a_H = 11.43$,
where $f_1$ is the focal length of the first lens of the corrector element, $f_2$ is the focal length of the second lens of the corrector element, e is the distance between the two lenses, and $a_H$ and $a_{H'}$ are the principal points of the lenses (See FIG. 5).

It is of particular importance to note that the description of the invention and the above example illustrate a negative field corrector group having one converging lens and one diverging lens. This was done to facilitate the explanation of the invention and should not be interpreted as a limitation of the scope thereof. The invention is capable of producing its described advantageous results when more than two lenses are included in the field corrector group, the only requirement being that the lenses are arranged so that the net power of the field group is negative.

It is believed that further advantages and modifications of the invention will be apparent to those of skill in the art. The description of the invention is intended to be illustrative and not limiting the scope of the invention, that scope being defined by the following claims and all equivalents thereto.

I claim:

1. In a two mirror optical system having a primary aspheric mirror with a primary reflecting surface and a secondary aspheric mirror with a secondary reflecting surface, said primary and secondary reflecting surfaces facing towards each other such that a ray incident to said primary reflecting surface is reflected towards said secondary surface, said ray then being reflected by said secondary reflecting surface back towards said primary reflecting surface, said primary mirror defining an aperture thereon, said aperture being so positioned that said ray reflected by said secondary reflecting surface passes through said aperture, the improvement comprising a field group corrector having net negative power, said field group corrector being positioned behind said aperture to receive said ray passing through said aperture, said negative field group corrector having a characteristic aberration which is opposite in sign to the characteristic Petzval curvature aberration of said primary and secondary mirrors, said negative field group corrector causing the object principal point (H) and the image principal point ($H^1$) to be located outside said negative field group corrector and disposed relative to said negative field group corrector to speed up the f number speed of said optical system, whereby the total aberration of said optical system is corrected because of reduction of said Petzval curvature aberration by said opposite sign aberration of said negative field group corrector and the f number of the optical system is speeded up.

2. A system as claimed in claim 1 wherein said primary reflecting surface is concave relative to said ray and said secondary reflecting surface is convex relative to said ray.

3. A system as claimed in claim 1 wherein said negative field corrector group is in alignment with said aperture of said primary spherical mirror.

4. A system as claimed in claim 1 wherein said negative field group corrector includes at least one positive (converging) lens and at least one negative (diverging) lens, the powers of said positive and said negative lenses being distributed such that said negative field group corrector has a net negative power.

5. A system as claimed in claim 4 wherein said negative field group corrector includes a plurality of positive (converging) lenses and a plurality of negative (diverging) lenses, the powers of said positive and negative lenses being distributed such that said negative field group corrector has a net negative power.

6. A system as claimed in claim 4 wherein said positive lens is positioned in front of said negative lens.

7. A system as claimed in claim 6 wherein the distance between said lenses is 4.337, the focal length of said positive lens is 14.79, the focal length of said negative lens is −4.89, the principal object distance of said negative group corrector is 3.74, and the principal image distance of said negative group corrector is 11.43.

8. A system as claimed in claim 1 wherein said object principal point and said image principal point are located behind said negative field group corrector, and said image principal point is closer to said negative field group corrector than is said object principal point.

9. A system as claimed in claim 1 wherein said system has a long back focal length.

10. A system as claimed in claim 1 wherein said system is used in a telescope.

11. A system as claimed in claim 1 wherein said primary mirror is positioned behind said secondary mirror.

* * * * *